F. MUNHOLLON.
METHOD OF FIRING KILNS.
APPLICATION FILED JULY 26, 1919.
1,399,070.
Patented Dec. 6, 1921.
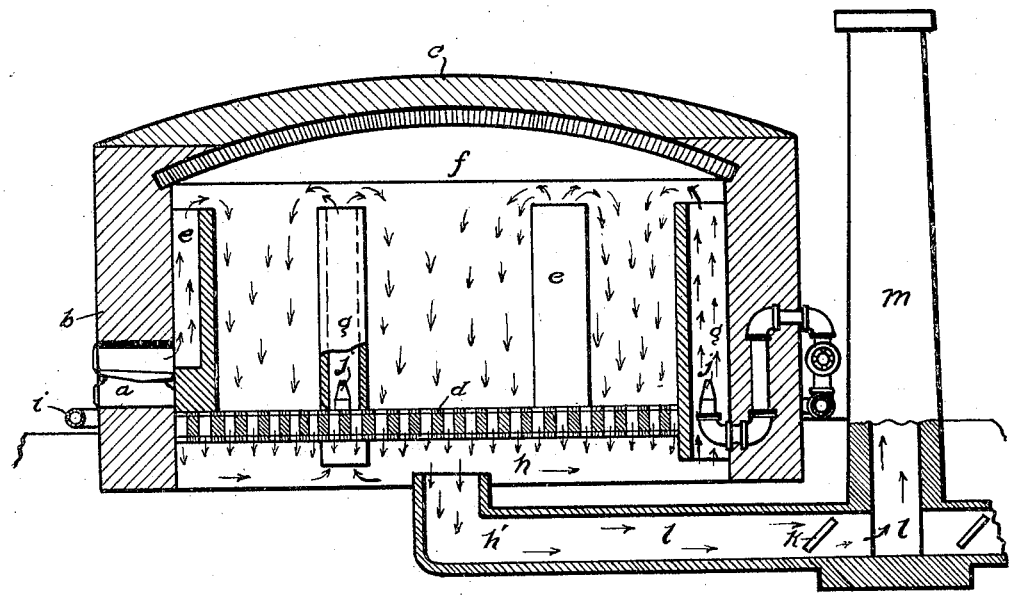
Inventor
FRANK MUNHOLLON,
Attorney.

UNITED STATES PATENT OFFICE.

FRANK MUNHOLLON, OF CLEVELAND, OHIO.

METHOD OF FIRING KILNS.

1,399,070.     Specification of Letters Patent.     Patented Dec. 6, 1921.

Application filed July 26, 1919. Serial No. 313,548.

*To all whom it may concern:*

Be it known that I, FRANK MUNHOLLON, a citizen of the United States of America, residing at Cleveland, in the county of Cuyahoga and State of Ohio, have invented certain new and useful Improvements in Method of Firing Kilns, of which the following is a specification.

My invention relates to improvements in method of firing kilns, and has for its object the provision of a more satisfactory, effective and economical mode or practice for firing semi-plastic or molded clay products in any suitable kiln or firing chamber.

My invention, as applied to its specialized use in brick drying and burning kilns and the like, was described and claimed somewhat specifically in my application for patent, Ser. No. 272,118, filed January 20th, 1919, now Patent No. 1,311,286. In this application I desire to claim the method herein set forth.

Generally speaking, my invention contemplates a method whereby a portion of the products of combustion are returned to the combustion chamber by means of a positively induced draft, such as one produced by a jet of air or steam under high pressure, whereby the combustion is furthered and the heat may be equalized.

Accordingly, the means contemplated by my invention, involve the provision of a reverting flue or flues in the kiln or other construction to which my improvements are applied, and associated with such flue or flues, are suitable means for inducing the reverting currents of the products of combustion therethrough. In connection with such means, I may control the stack effect of the furnace, so that combustion is conducted under favorable conditions, without withdrawing more of the products of combustion than is necessary to maintain firing at the desired rate.

The gaseous jet or column may be superheated with marked advantage, if desired.

My improvements will be explained in connection with the accompanying drawing illustrating diagrammatically the application of my invention to one type of kiln.

A downdraft kiln especially adapted for burning bricks or tiles may be used to explain my improvements. Therein, it is desirable to effect economical combustion, but still more important, to accomplish an even distribution of the heat so that the contents of the kiln will be properly fired. This is equally true in firing kilns for clay products generally.

The kiln is of the circular type having a plurality of fire-boxes or furnaces $a$ in its outer walls $b$ which are over arched at $c$. The floor $d$ is perforated to afford free communication between the firing chamber containing the bricks or other clay products, and the bottom compartment communicating with the chimney stack.

The firing chamber $f$ has a plurality of flues $e$ open adjacent to its dome $c$ and communicating with the respective furnaces for supplying heat thereto. Alternating therewith, are flues $g$ which extend from the upper portion of said firing chamber $f$ to the bottom compartment $h$. In each of said flues $g$ there are provided suitable means for inducing the reverse flow of the products of combustion from said compartment $h$ to the upper portion of the firing chamber.

I have shown and preferably employ the jets or nozzles $j$ connected with annular pipe $i$, which are assumed to be supplied with air or steam under pressure, for the purpose of directing a constant flow of the products of combustion from the compartment $h$ to the more highly heated portion of the firing chamber $f$, whereby the heating effect is materially augmented and equalized within the chamber, and complete combustion is approximated. By this arrangement, the clay products in the lower portion of the firing chamber will be subjected more nearly to the same heat as will those in the upper portion, and this obtains throughout the entire firing chamber. In order to further combustion, the damper $k$ in the flue $l$ connecting with the chimney stack $m$, is sufficiently opened merely to further the necessary or desired combustion in the furnaces, while retaining the products of combustion as long as may be practicable within the firing chamber and causing the circulation thereof to insure the maximum heating effect therefrom. This is greatly augmented by the reverse flow of the highly heated gases which is constantly effected by the steam or air jets within the flues $g$. Obviously, these flues may be positioned to connect any desired portions of the firing chamber with each other, but preferably, they are constructed and positioned as shown, in order to take the partly spent gases from a position adjacent to the chimney stack and return them to the more highly heated portions of the firing chamber.

The described apparatus insures relatively a very humid condition within the firing chamber, even at high temperatures, in which the drying of the bricks or other wares or product and their subsequent burning will proceed evenly and economically. Thus the exteriors of the bricks will be prevented from drying so much more rapidly than their interiors that checking and cracking otherwise would result, due to stresses set up in the structures. Instead, this relative humidity prevents the pores of the clay from closing or glazing initially, so that the interiors of the wares will be more quickly dried than before. The moisture from the drying product necessarily contains large amounts of latent heat, much of which is conserved by the reflex action of the steam jets *j*. This serves to return much of the highly heated moisture driven from the product, to the upper portion of the firing chamber, mixed with the products of combustion reverted therewith. There these gases mingle with the hot gases from the furnaces and render the latter relatively humid for the material betterment of the process and product. Under these conditions the heating is more even and penetrating than has been attained previously.

Having now explained my invention and my understanding of the theory of operation, I claim as new and desire to secure by Letters Patent, together with such modifications as may be made therein through the exercise of mere skill in the art, the following:

1. The herein described method of firing kilns, which consists in causing the reverting circulation of the products of combustion by a gaseous stream under pressure, substantially as and for the purpose set forth.

2. The herein described method of firing kilns, which consists in introducing the products of combustion to the kiln in one zone and returning the partially spent products against the stack effect through the action of a column of live gas under pressure, substantially as set forth.

3. The herein described method of firing kilns, which consists in introducing the products of combustion to the firing chamber in one zone and returning the partially spent products and the moisture from the wares in part against the stack effect approximately to said zone through the action of a gaseous medium under pressure, substantially as set forth.

4. The herein described method of firing clay wares, which consists in effecting the reverting circulation of a portion of the products of combustion together with their moisture content, by means of steam under pressure, and thereby mixing all the gaseous constituents to effect more even and economical heating and burning, substantially as set forth.

5. The herein described method of firing kilns, which consists in directing the products of combustion into an upper portion of the kiln from a plurality of inlets spaced along said kiln and withdrawing them from a lower portion of said kiln, effecting the reverting circulation of the products of combustion and their moisture content in part from the lower to an upper portion of the kiln, and withdrawing the spent gases, substantially as set forth.

6. The method of operating and increasing the efficiency of a kiln, which consists in causing the reintroduction of a portion of the products of combustion and steam into a more highly heated portion of the firing chamber for exhausting further heat therefrom and equalizing the temperature, substantially as set forth.

In testimony whereof I do now affix my signature.

FRANK MUNHOLLON.